INVENTOR.
THOMAS W. WALDROP
BY  *Walter V. Wright*

AGENT

United States Patent Office 3,389,732
Patented June 25, 1968

3,389,732
FORAGE CHOPPER
Thomas W. Waldrop, Ronks, Pa., assignor to Sperry
Rand Corporation, New Holland, Pa., a corporation of Delaware
Filed Oct. 5, 1966, Ser. No. 584,440
3 Claims. (Cl. 146—117)

This invention relates to agricultural machines of the type known as forage harvesters.

One component of a forage harvester is a chopper unit which receives crop material, chops it into small pieces and discharges the pieces rearwardly, usually into a trailing wagon. Thus, the forage chopper unit has two major functions: to chop crop material and to propel the material rearwardly with sufficient velocity to carry the material to a trailing wagon.

The chopper units comprise, generally, a horizontally disposed cylindrical housing having a front radial inlet and an upwardly and rearwardly directed tangential discharge outlet. A stationary shear bar is mounted at the lower edge of the inlet. A cutterhead having radial knives is rotatable within the housing. The knives move downwardly past the shear bar and then rearwardly along the bottom arcuate wall portion of the housing, which is commonly known as the "band," toward the discharge outlet. The propulsion of the material through the discharge outlet comes partly from the centrifugal throwing action of the knives and partly from the air current generated by the rapid rotation of the cutterhead and knives within the housing. Light dry material may be largely carried by the air current, while wet heavy material is more likely to be propelled by the force imparted thereto by actual contact with the knives.

For proper operation and maximum efficiency of these mechanisms, there are two areas where proper operating clearance between the parts is of a critical nature. There must be proper clearance between the cutterhead knives and the fixed shear bar and there must be proper radial clearance between the cutterhead knives and the housing band between the inlet and discharge openings. The proper shear bar-knife clearance is relatively easy to achieve since the shear bar extends in a straight line parallel to the axis of the cutterhead shaft. The achievement of proper clearance between the knives and the arcuate housing wall, or band, between the inlet opening and the discharge opening has always been a difficult, time consuming operation requiring considerable skill and patience.

The arcuate wall portion of the housing is usually provided with outturned mounting flanges which are mounted on the planar side walls of the housing. Mounting bolts extend through radial slots in the mounting flanges to enable the arcuate wall to be moved radially inwardly or outwardly. Eccentric formations are sometimes provided on the mounting bolts to facilitate radial adjustment of the arcuate wall. The operator, or assembler, of the machine, since he cannot see inside the chopper housing, adjusts the arcuate wall radially inwardly until the cutterhead knives touch it when the cutterhead is rotated by hand. He then "backs" the wall outwardly until the knives no longer touch. This requires delicate manipulation of a number of mounting bolts. While it is a safe adjustment from the standpoint of avoiding actual running contact between the knives and the band, it does not necessarily result in the attainment of the most uniform, efficient operating clearance between the knives and the arcuate housing wall.

Instances are known where a progressive decrease in the radial spacing between the knives and housing wall between the inlet and outlet has doubled the horsepower required to drive the cutterhead at proper speed. On the other hand, if the radial spacing between the knives and this particular portion of the housing is too great, the air current generated within the housing is affected and may not properly convey light, dry material. Also, of great importance is the fact that if the clearance is too great, material will hang over the edge of the cutterhead knives and drag over the housing causing an increase in the horsepower requirements and overheating of the housing due to the resulting friction.

It is a general object of this invention to provide improved mounting means for the arcuate wall portion, or band, of a forage chopper cutterhead housing.

It is another object of this invention to provide improved mounting means for the arcuate wall portion of a forage chopper cutterhead housing which requires no difficult, time consuming adjustments.

It is another object of this invention to provide mounting means for the arcuate wall portion of a forage chopper cutterhead housing which automatically establishes optimum operating clearance between the cutterhead knives and the housing.

It is another object of this invention to provide mounting means for the arcuate wall portion of a forage chopper cutterhead housing which allows the arcuate housing wall to be quickly and easily removed in the field for cutterhead servicing, and enables the arcuate wall to be quickly and accurately re-mounted by unskilled hands.

These and other objects of this invention will be more fully explained in the specification and drawings wherein.

Figure 1:
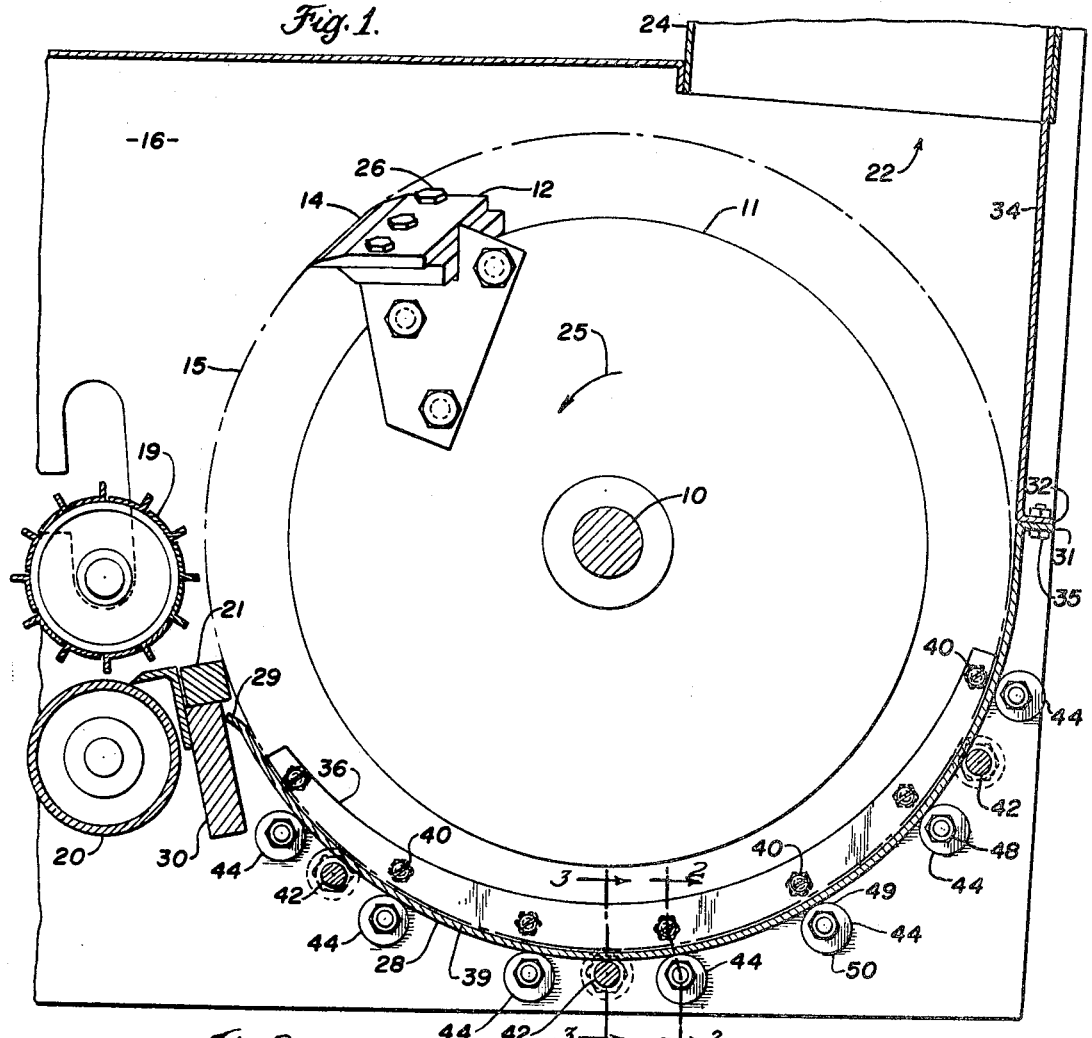
FIG. 1 is a fragmentary longitudinal sectional view of a forage harvester embodying a crop chopping unit constructed in accordance with the principles of the present invention.

Referring now to the drawings in detail, the reference numeral 10 in FIG. 1 indicates the central shaft of a forage chopper cutterhead. A number of discs 11 are fixed on shaft 10 and support a plurality of chopping blades, or knives, 12, one of which is illustrated in FIG. 1. Most forage chopper cutterheads are provided with six chopping blades of identical construction. The blade, or blades, 12 have knife edges 14 which, in operation, travel in the circular path indicated by the reference numeral 15.

The forage chopper cutterhead rotates inside a housing having planar side walls 16 and 18. The housing has a forward facing material inlet opening in which are mounted upper and lower feed rolls 19 and 20. A shear bar 21 extends between the housing side walls 16 and 18 directly behind the feed rolls 19 and 20. A discharge outlet 22 is provided in the housing at the top rear corner thereof and receives the usual discharge spout, a portion of which is visible in FIG. 1 and indicated by the reference numeral 24.

The direction of rotation of the cutterhead is indicated by the directional arrow 25 in FIG. 1. The path of travel 15 of the cutting edges 14 of the chopper knives extends downwardly along the rear edge of the fixed shear bar 21 whereby the cutting edges 14 co-act with shear bar 21 to chop crop material being moved rearwardly over the shear bar by feed rolls 19 and 20. Wear or sharpening of the knives, which moves the knife edges 14 inwardly from the desired path of rotation 15, is compensated for by loosening the knife mounting bolts 26 and moving the blade radially outwardly to relocate the knife cutting edge on the desired circular path of travel 15.

The housing has an arcuate wall 28 extending between the side walls 16 and 18. The arcuate wall 28 has a forward end 29 (FIG. 1) which rests against the rear face of the shear bar support 30. At the back side of the housing, arcuate wall 28 terminates in an outturned flange 31 which is connected to a mating flange 32 on the straight rear wall housing plate 34 by bolts 35.

For proper operation, there should be between 1/32 and 1/16 of an inch clearance, in the radial direction, between the inward face of arcuate wall 28 and the path of travel 15 of the cutterhead knife edges 14.

In accordance with the present invention, a pair of guide plates 36 and 38 (FIGS. 2 and 3) are provided, having arcuate outer edge surfaces 39, respectively. The radius of curvature of the surfaces 39 exceeds the radius of the circle 15 by 1/32 to 1/16 of an inch. The guide plates 36 and 38 are fixed by countersunk mounting bolts 40 to the side walls 16 and 18 of the housing, respectively. These guide plates are mounted on the inward sides of the housing walls with the center of curvature of the arcuate surfaces 39 falling on the axis of the cutterhead central shaft 10. The arcuate wall 28 of the housing is then slipped into place from the rear of the unit by inserting the forward end 29 thereof between the surfaces 39 of the guides 36 and 38 and the arcuate series of tie bolts 42 which interconnect the housing side walls 16 and 18 near the bottom of the housing (see FIG. 3). The arcuate wall 28 is relatively flexible since it does not include the usual integral mounting flanges. It passes readily end first through the radial space between the guide plate surfaces 39 and the housing tie bolts 42. When the arcuate wall 28 has been inserted full length, the bolts 35 are inserted through the connecting flanges 31 and 32 at the rear of the machine.

Below and outside lower arcuate wall 28, along with the arcuate series of tie bolts 42, an arcuate series of eccentric clamping devices 44 are provided on each of the housing side walls 16 and 18. Each eccentric clamping device 44 comprises a disc 45 (FIG. 2) of circular configuration having an aperture 46 therethrough in an off-center location. Mounting studs 48 are carried by the respective housing side walls 16 and 18 and extend through the eccentric apertures 46 of the clamping discs 45 thereby creating on each disc 45 a minimum radius portion 49 and a maximum radius portion 50 relative to the axis of the stud 48 upon which each disc 45 is carried. As may be seen in FIG. 2, a nut 51 is welded to the inward face of each clamping disc 45 and thereby made integral with the disc. The threaded bore of the nut is axially aligned with the aperture 46 through the disc and is threadedly received on the mounting stud 48.

Figure 2:
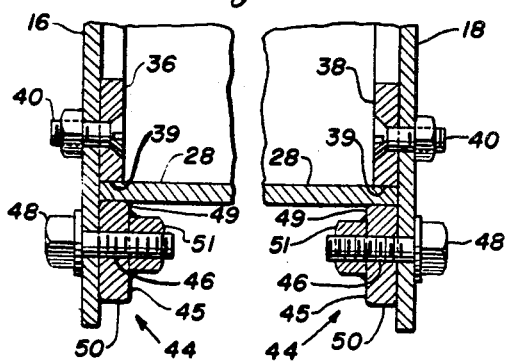
FIG. 2 is a sectional view taken on the line 2—2 of FIG. 1.
Figure 3:
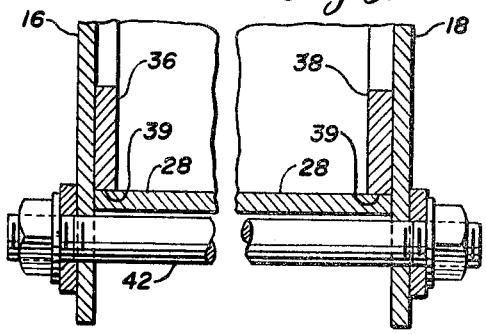
FIG. 3 is a sectional view taken on the line 3—3 of FIG. 1.

It will be apparent from FIG. 2 that when the arcuate wall 28 of the housing is fully inserted between the guide plates 36 and 38 and the housing tie rods 42, a conventional wrench may be applied to the nuts 51 of the eccentric clamping means to rotate the clamping discs 45 about the axes of the mounting studs 48 and clamp the arcuate wall 28 of the housing radially inwardly against the exactly located arcuate outer surfaces 39 of the guide plates 36 and 38. Having thus drawn the arcuate wall 28 radially inwardly to its exact location, the operator simply applies a second wrench to the head of mounting stud 48 to rotate the stud into the nut 51 thereby locking the eccentric clamping device fixed to its respective housing side wall 16 and 18. It will be apparent from FIGS. 1 and 2 that both the heads 48 and the nuts 51 of the eccentric clamping devices are readily accessible from the underside of a forage harvester implement. No measuring or adjusting is required to establish the exact positioning of the housing band.

In addition to the objects mentioned above, it has been found that elimination of the customary outturned mounting flanges from the arcuate wall 28 of the housing has greatly increased the flexibility of this member and the ease with which it may be maneuvered into and out of its operative location relative to other main implement frame members and the like not shown in the drawing.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described my invention, what I claim is:

1. In combination with a forage chopper cutterhead having a central shaft and knives mounted on said shaft, said knives having cutting edges rotatable in a predetermined circular path about the axis of said shaft, a housing having a pair of planar parallel side walls between which said shaft extends, said housing having a forward inlet, a rearward outlet and a separable arcuate peripheral wall disposed between said inlet and outlet and extending between said side walls, said arcuate wall having a position requirement of being parallel and closely spaced relative to said predetermined circular path of rotation of said cutting edges, improved means for mounting said arcuate wall on said side walls comprising, a pair of arcuate guide plates, each of said guide plates having an arcuate outer surface whose radius of curvature exceeds that of the circular path of travel of said cutting edges by a predetermined amount corresponding to the required position of said arcuate wall, means fixedly mounting said guide plates respectively on the inward sides of said parallel side walls with said arcuate surfaces concentric relative to the axis of said cutterhead shaft, and means interengaging said arcuate wall and said side walls and forcing said arcuate wall radially inwardly against said arcuate surfaces to clamp said arcuate wall in its required position.

2. The combination recited in claim 1 wherein said last named means comprises a plurality of studs carried by each of said housing side walls, a plurality of eccentrics, one eccentric carried by each of said studs, each of said eccentrics having a minimum radius portion and a maximum radius portion relative to the axis of the stud upon which it is carried, said studs being spaced apart along the extent of said arcuate wall and disposed radially outwardly therefrom a distance greater than said minimum radius portion and less than said maximum radius portion of each eccentric, and means on each of said eccentrics to facilitate selective rotation of the eccentric about the axis of its stud and to coact with the stud for locking the eccentric in any given position.

3. The combination recited in claim 2 wherein said last named means comprises a nut integral with said eccentric and threaded on said stud whereby simultaneous rotation of said nut and stud about the axis of the stud effects rotation of said eccentric about the stud axis, and rotation of said nut and stud in one direction relative to each other effects movement of said eccentric axially along said stud toward said housing side wall to clamp said eccentric relative to said side wall.

References Cited
UNITED STATES PATENTS

| | | | |
|---|---|---|---|
| 2,420,966 | 5/1947 | Molz et al. | 241—89 X |
| 3,217,765 | 11/1965 | Anderson | 146—123 X |
| 3,237,768 | 3/1966 | Koch et al. | 241—89 X |

W. GRAYDON ABERCROMBIE, *Primary Examiner.*